United States Patent
Wakako et al.

(10) Patent No.: US 11,676,439 B2
(45) Date of Patent: Jun. 13, 2023

(54) FACE AUTHENTICATION SYSTEM AND FACE AUTHENTICATION METHOD

(71) Applicant: PANASONIC I-PRO SENSING SOLUTIONS CO., LTD., Fukuoka (JP)

(72) Inventors: Takeshi Wakako, Fukuoka (JP); Eisaku Miyata, Kanagawa (JP); Akihiko Fukada, Kanagawa (JP); Koji Kawamoto, Fukuoka (JP); Masashige Tsuneno, Fukuoka (JP); Junichi Ishikawa, Fukuoka (JP); Haru Kamada, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 27 days.

(21) Appl. No.: 17/122,556

(22) Filed: Dec. 15, 2020

(65) Prior Publication Data
US 2021/0216755 A1    Jul. 15, 2021

(30) Foreign Application Priority Data
Jan. 14, 2020    (JP) .............................. JP2020-003752

(51) Int. Cl.
*G06T 9/00*    (2006.01)
*G08B 25/04*    (2006.01)
(Continued)

(52) U.S. Cl.
CPC .............. *G07C 9/37* (2020.01); *G06V 20/52* (2022.01); *G06V 40/166* (2022.01);
(Continued)

(58) Field of Classification Search
CPC ...... G06V 40/172; G06V 10/24; G06V 20/69; G06V 40/166; G06V 40/50; G06V 20/52;
(Continued)

(56) References Cited

U.S. PATENT DOCUMENTS

| 7,454,041 B2 * | 11/2008 | Sukegawa ............ G06K 9/6255 382/218 |
| 10,949,652 B1 * | 3/2021 | Cruz .................... G06V 40/168 |

(Continued)

FOREIGN PATENT DOCUMENTS

JP    2018-092293    6/2018

*Primary Examiner* — Emily C Terrell
*Assistant Examiner* — Ahmed A Nasher
(74) *Attorney, Agent, or Firm* — Greenblum & Bernstein, P.L.C.

(57) ABSTRACT

A face authentication system including a storage to store a face image of each of a plurality of persons who are permitted to enter in advance and information on a zone; an image processing unit to detect a face of at least one person in an image captured by at least one camera having identification information, and generate a face cut-out image of the at least one person; a zone determination unit to determine a zone where a person in the face cut-out image is captured; a collation unit to collate the face cut-out image with the face image of each of the plurality of persons; and an output control unit to, when it is determined that there is not a face of a person appearing in the face cut-out image, superimpose a detection frame indicating a face of a person who is not permitted to enter the zone.

20 Claims, 7 Drawing Sheets

(51) Int. Cl.
  *G07C 9/37*   (2020.01)
  *G07C 9/00*   (2020.01)
  *G06V 40/16*  (2022.01)
  *G06V 40/50*  (2022.01)
  *G06V 20/52*  (2022.01)
  *G06V 10/24*  (2022.01)

(52) U.S. Cl.
  CPC ............ *G06V 40/172* (2022.01); *G06V 40/50* (2022.01); *G07C 9/00563* (2013.01); *G06V 10/24* (2022.01)

(58) Field of Classification Search
  CPC .. G07C 9/00563; G07C 9/37; G06T 2210/12; G06T 11/20; G06T 2207/30232; G06T 7/0002; G06T 2207/20212
  See application file for complete search history.

(56) References Cited

U.S. PATENT DOCUMENTS

| | | | | |
|---|---|---|---|---|
| 2002/0094111 | A1* | 7/2002 | Puchek | G07C 9/257 382/115 |
| 2007/0031010 | A1* | 2/2007 | Sukegawa | G06V 40/172 382/118 |
| 2021/0201269 | A1* | 7/2021 | Ainsworth | G07C 9/257 |
| 2021/0397685 | A1* | 12/2021 | Takenouchi | G06V 40/50 |

\* cited by examiner

FIG. 3
|  |  | EXPIRATION DATE | ZONE A | ZONE B |
|---|---|---|---|---|
| LT1 → | 1 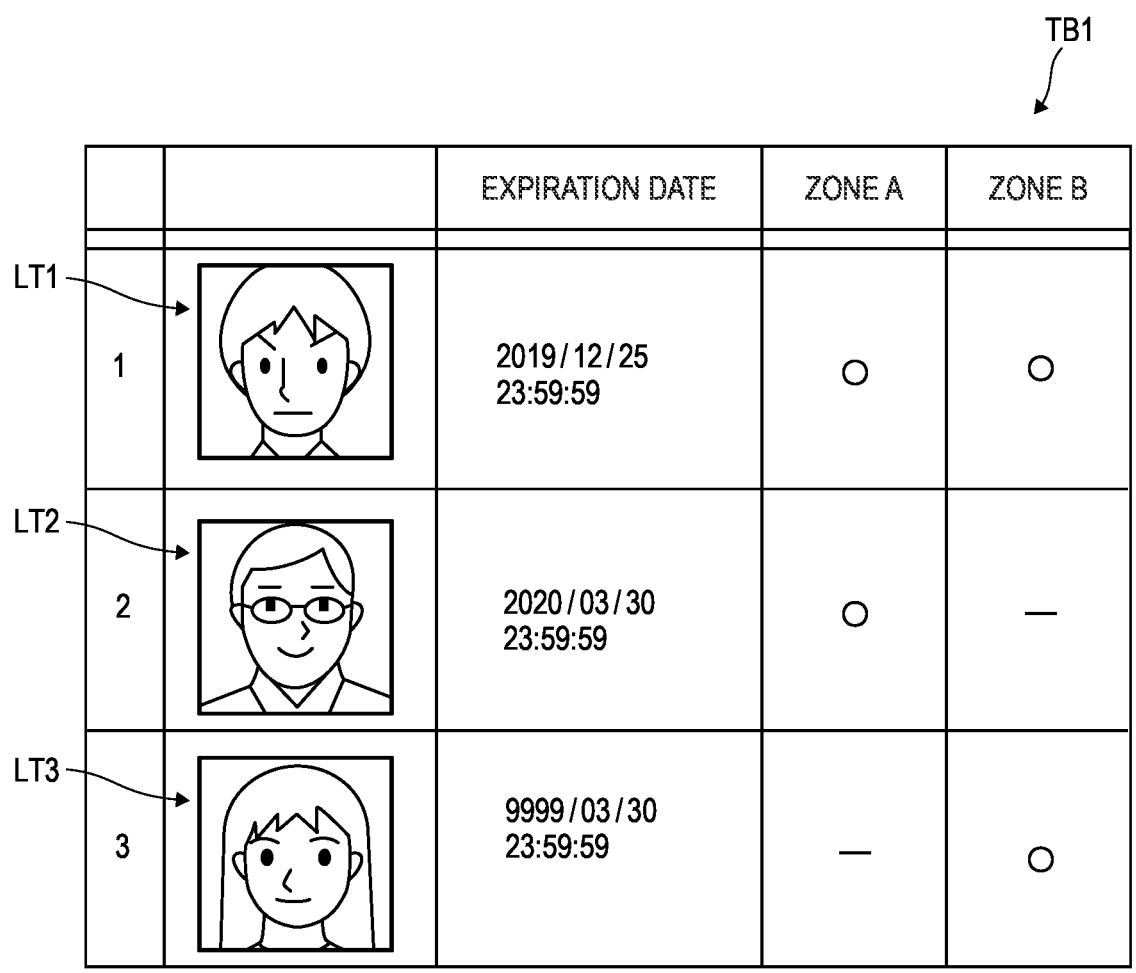 | 2019 / 12 / 25<br>23:59:59 | ○ | ○ |
| LT2 → | 2 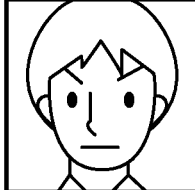 | 2020 / 03 / 30<br>23:59:59 | ○ | — |
| LT3 → | 3 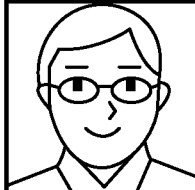 | 9999 / 03 / 30<br>23:59:59 | — | ○ |
TB1

(St9B-1)
PASSING WHEN EXPIRATION DATE HAS EXPIRED (St9B-2)
WHEN PASS UNPERMITTED ZONE

FACE AUTHENTICATION SYSTEM AND FACE AUTHENTICATION METHOD

BACKGROUND OF THE INVENTION

1. Field of the Invention

The present disclosure relates to a face authentication system and a face authentication method.

2. Background Art

JP-A-2018-92293 discloses an entrance/exit management system that manages entrance/exit of a user in an entrance/exit gate of a managed area. The entrance/exit management system includes: a face image database where face image data of a user and data related to the user are registered in association with each other; a plurality of isolation walls consisting of a plurality of gates having a width that allows a single user to pass therethrough; an imaging unit for acquiring image data of the plurality of gates; a face authentication unit for performing face authentication of a plurality of persons acquired in an image acquisition zone in the registered face image data and the image data acquired by the imaging unit; and a notification unit for notifying the user passing through the gate of the face authentication result.

SUMMARY OF THE INVENTION

In a configuration of the entrance/exit management system of JP-A-2018-92293 described above, it is possible to capture an image of the single user passing through the image acquisition zone set according to the width of the gate through which the user can pass, and authenticate whether the user is a user registered in the face image database based on the acquired image data of the user. However, the entrance/exit management system does not consider the passage of each of the plurality of users, and when the plurality of users pass through the gate at the same time, there is a possibility that the face authentication of the user cannot be accurately executed since the plurality of users are showed in the image data acquired in one image acquisition zone.

The present disclosure has been made in view of the above circumstances, and an object thereof is to provide a face authentication system and a face authentication method that detect and output a person who does not have permission to enter among a plurality of persons who enter a monitored area and more efficiently support a monitoring work of a user.

The present disclosure provides a face authentication system including a storage configured to store a face image of each of a plurality of persons who are permitted to enter in advance and information on a zone in association with each other, an image processing unit configured to detect a face of at least one person in an image captured by at least one camera having identification information, and generate a face cut-out image obtained by cutting out a detected face portion of the at least one person, a zone determination unit configured to determine a zone where a person in the face cut-out image is captured based on the identification information of the camera, a collation unit configured to collate the face cut-out image with the face image of each of the plurality of persons who are permitted to enter the zone in advance, and an output control unit configured to, when it is determined by collation that there is not a face of a person appearing in the face cut-out image among the face images of the plurality of persons who are permitted to enter the zone in advance, superimpose a detection frame indicating a face of a person who is not permitted to enter the zone on the face cut-out image, and output the face cut-out image with the detection frame.

In addition, the present disclosure provides a face authentication method including storing a face image of each of a plurality of persons who are permitted to enter in advance and information on a zone in association with each other into a storage, detecting a face of at least one person in an image captured by at least one camera having identification information, and generating a face cut-out image obtained by cutting out a detected face portion of the at least one person, determining a zone where a person in the face cut-out image is captured based on the identification information of the camera, collating the face cut-out image with the face image of each of the plurality of persons who are permitted to enter the zone in advance, and when it is determined by collation that there is not a face of a person appearing in the face cut-out image among the face images of the plurality of persons who are permitted to enter the zone in advance, superimposing a detection frame indicating a face of a person who is not permitted to enter the zone on the face cut-out image, and outputting the face cut-out image with the detection frame.

According to the present disclosure, it is possible to provide the face authentication system and the face authentication method that detect and output a person who does not have permission to enter among a plurality of persons who enter the monitored area, and more efficiently support a monitoring work of a user.

BRIEF DESCRIPTION OF THE DRAWINGS

FIG. 3 is a view showing an example of a registrant memory table.

DETAILED DESCRIPTION OF THE EXEMPLARY EMBODIMENT

Hereinafter, an embodiment of a face authentication system and a face authentication method according to the present disclosure will be described in detail with reference to the accompanying drawings. However, unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for those skilled in the art to fully understand the present disclosure, and are not intended to limit the claimed subject matter.

Figure 1:
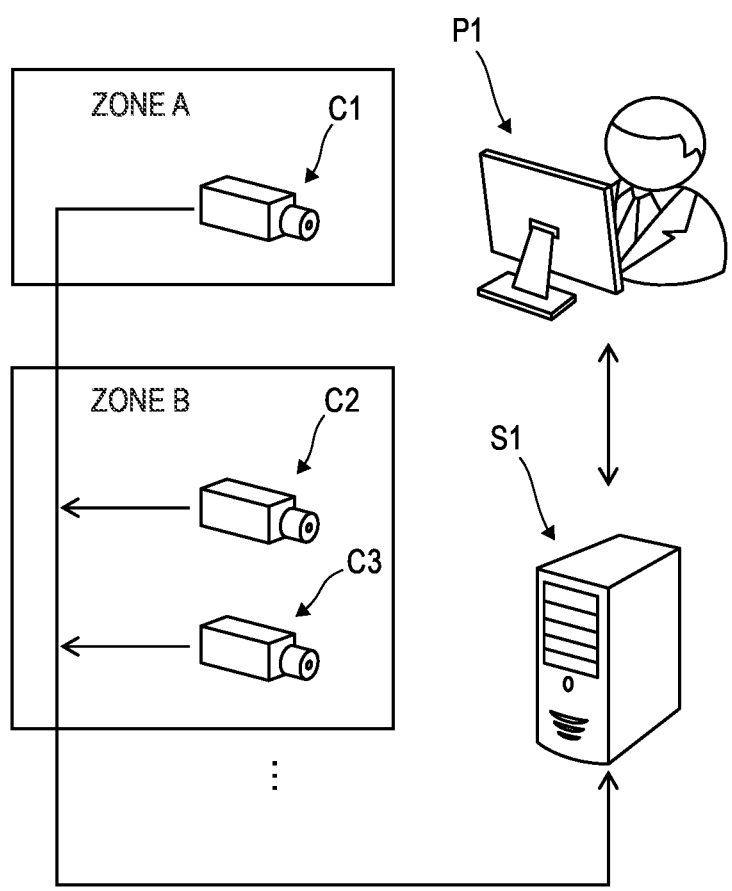
FIG. 1 is a view showing an overall configuration example of a face authentication system according to a first embodiment.

An overall configuration example of a face authentication system 100 according to a first embodiment will be described with reference to FIG. 1. FIG. 1 is a view showing a configuration example of the face authentication system 100 according to the first embodiment.

The face authentication system 100 according to the first embodiment is provided in a building such as a company, a condominium, or a commercial facility. The face authentication system 100 captures images of one or more persons who enter a zone in a building (for example, an area such as a doorway, a room, a floor, or an elevator of the building), determines whether the captured person is permitted to enter in the entered zone, and outputs the determined result to a user (for example, an administrator, or the like). The face authentication system 100 includes cameras C1, C2, C3, . . . , a server S1 and a terminal device P1. Note that the server S1 and the terminal device P1 may be integrally configured.

A plurality of cameras C1, . . . are connected to the server S1 so as to be able to perform data communication, and transmits a captured image to the server S1, respectively. The plurality of cameras C1, . . . are installed in a plurality of zones A, B, . . . serving as monitored areas where the entry of a plurality of persons is monitored, and captures images of the plurality of persons entering the plurality of zones A, B, . . . , respectively. For example, in the example shown in FIG. 1, the camera C1 is installed in the zone A. In addition, the plurality of cameras C2, C3 are installed in the zone B.

Each of the plurality of cameras C1, . . . is assigned camera identification information that can specify and identify an installed zone and an installed position by a user operation. The identification information of each of the plurality of cameras C1, . . . is recorded in the server S1. Note that the identification information of each of the plurality of cameras C1, . . . may be recorded in the terminal device P1 and transmitted to the server S1. Each of the plurality of cameras C1, . . . detects a face of a person or faces of the plurality of persons from the captured image, generates a cut-out face cut-out image, and transmits the generated face cut-out image and the identification information of the camera to the server S1. Note that, when each of the plurality of persons is shown in the captured image, the face cut-out image cut out here is cut out and generated as a face cut-out image including the face of each of the plurality of persons.

Each of the plurality of cameras C1, . . . generates position coordinate information of a face indicating a position coordinate of a detected face of the person. Each of the plurality of cameras C1, . . . transmits the face cut-out image, the position coordinate information of the face of the person shown in the face cut-out image, and the identification information of the camera to the server S1.

A processing of detecting the face of the person from the captured image, a processing of acquiring the position coordinate information of the detected face of each person, and a processing of generating the face cut-out image may be executed by the server S1. In such a case, the server S1 acquires the captured image captured by each of the plurality of cameras C1, . . . and the identification information of the camera that captures the captured image.

The terminal device P1 is connected to the server S1 so as to be able to perform data communication. The terminal device P1 displays alert notification transmitted from the server S1 on a monitor. The terminal device P1 may record zone identification information (for example, a position, a zone name, or the like) of each of the plurality of zones A, . . . for executing face authentication input by a user operation, and the camera identification information of each of the plurality of cameras C1, . . . (for example, management number, manufacturing number, or the like). In addition, the terminal device P1 may generate and record grouping information including identification information of the camera installed for each zone input by a user operation. When the terminal device P1 generates the grouping information including the identification information of the camera, the terminal device P1 may transmit the recorded zone identification information, camera identification information, and grouping information to the server S1 and record the information.

The terminal device P1 accepts a user operation regarding a face image of a person who can enter any one of the plurality of zones A, . . . , information on a zone where the entry is permitted, and an expiration date indicating a deadline for the entry. The face image of the person may be feature amount data of a face.

In the following description, an example in which the face authentication is executed by a collation processing using face images of a plurality of persons will be described, but the face authentication may be executed by the collation processing using a feature amount of the face.

The server S1 is connected to the plurality of cameras C1, . . . and the terminal device P1 so as to be able to perform data communication.

The server S1 generates and records grouping information including the identification information of the camera installed for each zone input by a user operation. The server S1 transmits the recorded zone identification information, camera identification information, and grouping information to the terminal device P1. In addition, the server S1 generates a registrant memory table TB1 in which the face image or the feature amount data of the face of each of the plurality of persons registered by the user, the information on a zone, and the expiration date are associated with each person, and records (registers) a registrant database 33 (see FIG. 2). The registrant memory table TB1 may be transmitted from the server S1 to the terminal device P1 and recorded in a registrant database 15. The server S1 records the zone identification information of each of the plurality of zones A, . . . transmitted from the terminal device P1, the camera identification information of each of the plurality of cameras C1, . . . , the grouping information of the camera and the registrant memory table TB1.

Regarding the various setting information of each of the plurality of persons recorded in the registrant memory table TB1 or the registrant database 15 (the face image, the information on the zone, and the expiration date), the server S1 may delete various setting information of a person whose expiration date has expired, or may continuously record various setting information without deleting the information.

The server S1 receives the face cut-out image and the camera identification information (for example, an IP address for each camera, or the like) from each of plurality of cameras C1, . . . . The server S1 determines a zone in which the face cut-out image is captured based on the camera identification information. The server S1 collates the face image of each of the plurality of persons permitted to enter in the zone identification information determined in the registrant memory table TB1 with the face cut-out image.

When it is determined that the person shown in the face cut-out image is permitted to enter the zone as a result of the collation, the server S1 further determines whether the expiration date for which the person is permitted to enter has expired.

The server S1 generates an alert notification (see FIGS. 6A and 6B) as a determined result when the person shown in the face cut-out image is not permitted to enter the zone or the expiration date for which the person is permitted to enter has expired. The generated alert notification is transmitted from the server S1 to the terminal device P1, and is displayed on a monitor 13 (see FIG. 2) in the terminal device P1.

The alert notification may be generated by the terminal device P1. In such a case, the terminal device P1 acquires the face cut-out image including the person who is not permitted to enter the zone as the determined result from the server S1, and the position coordinate information of the face indicating the position of the face of the person who is not permitted to enter in the face cut-out image, and generates the alert notification.

On the other hand, the server S1 generates an alert notification (see FIG. 6A) as a determined result using the face image and the face cut-out image recorded (registered) in the registrant memory table TB1 when the person shown in the face cut-out image is permitted to enter the zone and the expiration date for which the person is permitted to enter has expired. The generated alert notification is transmitted from the server S1 to the terminal device P1, but is displayed on the monitor 13 (see FIG. 2) in the terminal device P1.

Figure 2:
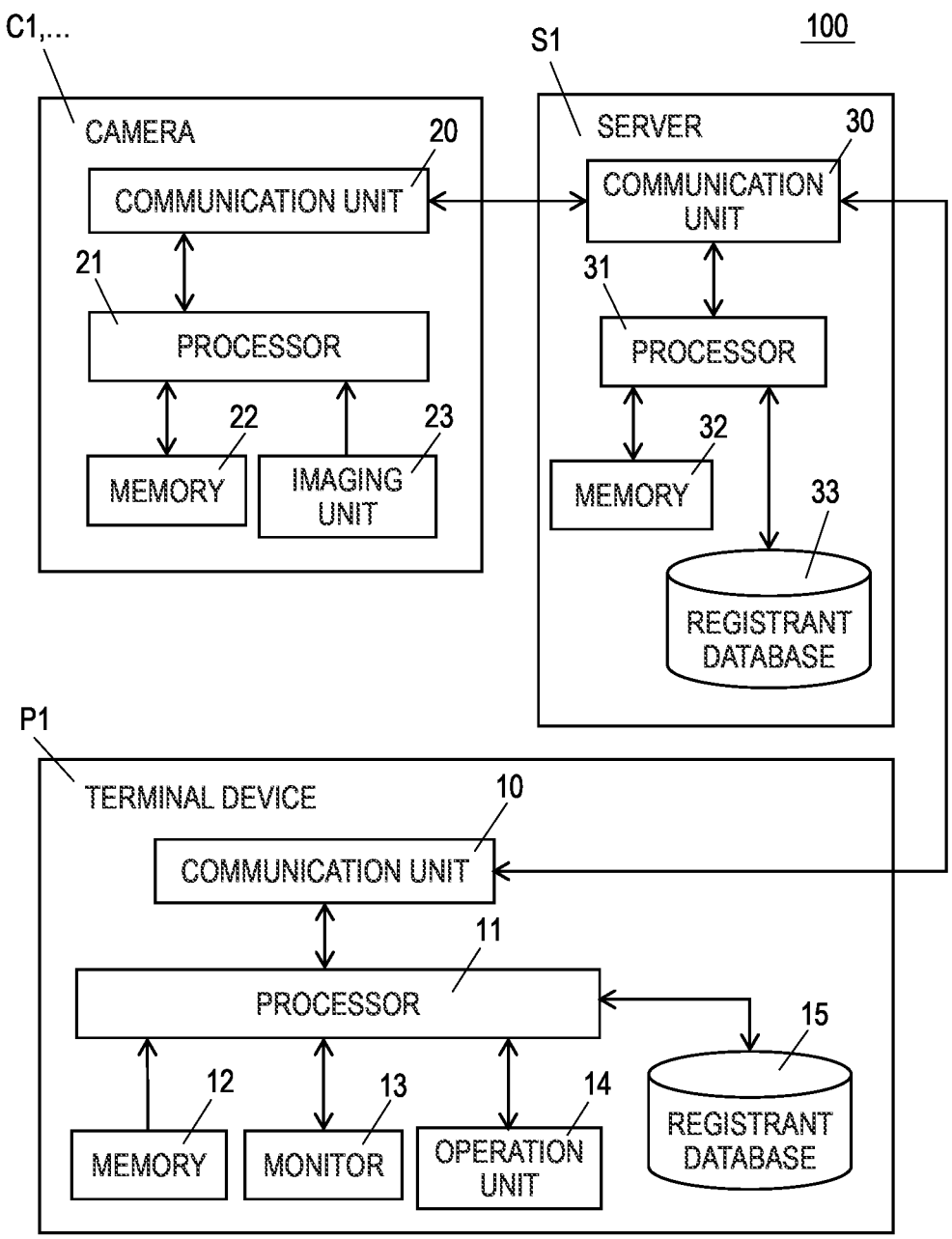
FIG. 2 is a view showing an internal configuration example of the face authentication system according to the first embodiment.

FIG. 2 is a view showing an internal configuration example of the face authentication system 100 according to the first embodiment.

The terminal device P1 includes a communication unit 10, a processor 11, a memory 12, the monitor 13, an operation unit 14, and the registrant database 15. The registrant database 15 shown in FIG. 2 may be realized as an external terminal device or an external storage device connected to the terminal device P1 so as to be able to perform external communication. Although not shown in FIG. 2, the terminal device P1 may be connected to a face image database that records (registers) each of the face images of a plurality of persons as an external terminal device or an external storage device. In such a case, when generating the registrant memory table TB1, the terminal device P1 acquires a face image of a person to be recorded (registered) from the face image database.

The communication unit 10 is connected to a communication unit 30 in the server S1 so as to be able to perform data communication via a network. The communication unit 10 receives the determined result (alert notification) as a face authentication result transmitted from the server S1 and inputs the result to the processor 11.

The processor 11 as an example of an output control unit is configured using, for example, a central processing unit (CPU) or a field programmable gate array (FPGA), and performs various processes and controls in cooperation with the memory 12. Specifically, the processor 11 refers to a program and data held in the memory 12, and executes the program to implement functions of the respective units.

When the determined result as the face authentication result input from the communication unit 10 transmitted from the server S1 is alert notification, the processor 11 outputs and displays the alert notification on the monitor 13. When the processor 11 acquires the face cut-out image including the person who is not permitted to enter the zone as the determined result from the server S1 and the position coordinate information of the face indicating the position of the face of the person whose entry is not permitted in the face cut-out image, the processor 11 may superimpose a detection frame on the face cut-out image based on the position coordinate information of the face to generate the alert notification, and output and display the generated alert notification on the monitor 13.

The memory 12 as an example of a storage includes, for example, a random access memory (RAM) as a work memory used when executing each processing of the processor 11, and a read only memory (ROM) for storing programs and data defining an operation of the processor 11. The RAM temporarily stores data or information generated or acquired by the processor 11. A program that defines the operation of the processor 11 is written in the ROM. The memory 12 may record the registrant memory table TB1 transmitted from the server S1.

The monitor 13 is configured using a display such as a liquid crystal display (LCD) or an organic electroluminescence (EL). The monitor 13 displays a setting screen for setting the recorded zone identification information, camera identification information, grouping information, and various setting information. Further, the monitor 13 displays the alert notification received from the server S1.

The operation unit 14 is, for example, a user interface that detects an input operation of a user, and is configured using a mouse, a keyboard, a touch panel, or the like. Based on the input operation of the user, the operation unit 14 receives settings of various setting types, converts the settings into signals, and outputs the signals to the processor 11.

The registrant database 15 includes a semiconductor memory such as a RAM and a ROM, and a storage device including any of storage devices such as a solid state drive (SSD) and a hard disk drive (HDD). The registrant database 15 records the face image of each of the plurality of persons recorded in the registrant memory table TB1.

Next, a configuration of each of the plurality of cameras C1, . . . will be described. The camera C1 includes a communication unit 20, a processor 21, a memory 22, and an imaging unit 23. Note that the plurality of cameras C1, . . . have substantially the same configuration. In the following description, the configuration of the camera C1 will be described, and a description of the configuration of another camera C2 will be omitted.

The communication unit 20 is connected to the communication unit 30 in the server S1 so as to be able to perform data communication via a network. The communication unit 20 transmits the face cut-out image generated by the processor 21 and the camera identification information of the camera C1 to the server S1.

The processor 21 as an example of an image processing unit is configured using, for example, a CPU or an FPGA, and performs various processes and controls in cooperation with the memory 22. Specifically, the processor 21 refers to a program and data held in the memory 22, and executes the program to implement the functions of the respective units. The function referred to here is, for example, a function of detecting a face of a person shown in a captured image or a function of generating a face cut-out image in which a detected face region of a person is cut out.

When the captured image captured by the imaging unit 23 is input, the processor 21 detects the face of the person shown in the input captured image. When a plurality of persons are shown in the captured image, the processor 21 detects a face of each of the plurality of persons. The processor 21 generates the face cut-out image obtained by cutting out the detected face of the person, and transmits the generated face cut-out image, the position coordinate information of the detected face of each person, and the camera identification information of the camera C1 to the server S1 via the communication unit 20.

When generating the face cut-out image, the processor 21 cuts out a face of each of the plurality of persons in a predetermined cut-out range. When there is a region in which the cut-out range overlaps with a cut-out range of a face of the other person, the processor 21 may cut out the cut-out range including the cut-out range of the face of each of the plurality of persons and generate a face cut-out image. In such a case, the face cut-out image is cut out by including the faces of the plurality of persons, and the position coordinate information of the face of each person included in the predetermined cut-out range is assigned to identify the detected face of each person.

The memory 22 includes, for example, a RAM as a work memory used when each processing of the processor 21 is executed, and a ROM that stores programs and data defining the operation of the processor 21. The RAM temporarily stores data or information generated or acquired by the processor 21. A program that defines the operation of the processor 21 is written in the ROM. The memory 22 records the camera identification information of the camera C1. The memory 22 may record the grouping information of the camera.

The imaging unit 23 includes at least a lens (not shown) and an image sensor (not shown). The image sensor is a solid-state image capturing device such as a charge-coupled device (CCD) or a complementary metal-oxide semiconductor (CMOS), and converts an optical image formed on an imaging surface into an electrical signal. The imaging unit 23 outputs the captured image to the processor 21.

The server S1 respectively collates the face images of the plurality of persons included in the registrant memory table TB1 with the face cut-out images transmitted from the plurality of cameras C1, . . . , and executes the face authentication. The server S1 includes the communication unit 30, a processor 31, a memory 32, and the registrant database 33.

The communication unit 30 is connected to the communication unit 10 in the terminal device P1 and the communication unit 20 in the camera C1 so as to be able to perform data communication via a network. The communication unit 30 transmits the set recorded zone identification information, camera identification information, grouping information of the camera, and the registrant memory table TB1 generated by the processor 11 to the terminal device P1. In addition, the communication unit 30 outputs the face cut-out image transmitted from the camera C1, the position coordinate information of the face, and the camera identification information to the processor 31. The communication unit 30 transmits the determined result (alert notification) as the face authentication result generated by the processor 31 to the terminal device P1.

The processor 31 as an example of an image processing unit, a zone determination unit, a collation unit, and an output control unit is configured using, for example, a CPU or an FPGA, and performs various processes and controls in cooperation with the memory 32. Specifically, the processor 31 refers to a program and data held in the memory 32, and executes the program to implement the functions of the respective units. The function referred to here is, for example, a function of generating the registrant memory table TB1 based on various setting information, a function of determining a zone in which the camera is installed based on the camera identification information, a function of, based on the determined zone identification information, referring to the registrant memory table TB1 and determining whether a person shown in the face cut-out image is a person who is permitted to enter the zone, and a function of generating an alert notification of a person who is not permitted to enter as a determined result.

In the processor 31, for example, the face cut-out image and the camera identification information transmitted from the camera C1 are input from the communication unit 30. The processor 31 collates the camera identification information recorded in the memory 32 with the input camera identification information, and determines that the camera in which the face cut-out image is captured is, for example, the camera C1. The processor 31 executes the collation processing with reference to the registrant memory table TB1 recorded in the memory 32 for each person shown in the face cut-out image transmitted from the camera C1. In addition, the processor 31 determines a zone in which the camera is installed based on the camera identification information and the grouping information recorded in the memory 32.

Based on the determined zone identification information, the processor 31 refers to the registrant memory table TB1 and determines whether the person shown in the face cut-out image is a person (registrant) who is permitted to enter the zone. Specifically, the processor 31 collates the face images of the persons shown in the face cut-out image with the face image of each of the plurality of persons recorded in the registrant memory table TB1, respectively. The processor 31 may execute collation based on a feature amount of the face.

When it is determined that the person shown in the face cut-out image is not a registrant recorded in the registrant memory table TB1 as a result of the collation, the processor 31 generates an alert notification notifying the user that the person shown in the face cut-out image is a person who is not permitted to enter the zone. The processor 31 superimposes a detection frame surrounding the face of a person who is not permitted to enter on the face cut-out image based on the position coordinate information of the face transmitted from the camera. The processor 31 transmits the alert notification including the face cut-out image on which the detection frame is superimposed and the information on the zone in which an image of the person is captured to the terminal device P1. The processor 31 may generate an alert notification including the face image recorded in the registrant memory table TB1 when the person is a person recorded in the registrant memory table TB1 and is not permitted to enter the imaged zone.

Further, when it is determined that the person shown in the face cut-out image is a person recorded in the registrant memory table TB1 as a result of the collation, the processor 31 further refers to the registrant memory table TB1, and determines whether the expiration date indicating a period for allowing the person to enter has expired.

As a determined result, when it is determined that the person shown in the face cut-out image is the registrant recorded in the registrant memory table TB1 and the expiration date has expired, the processor 31 generates an alert notification notifying the user that the person shown in the face cut-out image is a person who is not permitted to enter the zone. Specifically, based on the position coordinate information of the face transmitted from the camera, the processor 31 superimposes the detection frame surrounding a face region of the person whose expiration date has expired on the face cut-out image. The processor 31 transmits an alert notification including the face cut-out image on which the detection frame is superimposed and the information on the zone in which the image of the person is captured to the terminal device P1. The processor 31 may further generate an alert notification including information on the expiration date and transmit the alert notification to the terminal device P1.

The collation processing of the face by the processor 31 described above may be executed using learning data generated in advance. In such a case, the processor 31 may further include an AI processing unit (not shown). The AI processing unit includes, for example, a CPU, a digital signal processor (DSP), or an FPGA, and includes a learning model database storing feature amount data of the face images of the plurality of persons stored in the past.

The AI processing unit (not shown) executes the collation processing of the face based on the face cut-out image transmitted from the camera and the face images of the plurality of persons recorded in the registrant memory table TB1.

The learning model database includes a semiconductor memory such as a RAM and a ROM, and a storage device including any of storage devices such as a solid state drive (SSD) and a hard disk drive (HDD). The learning model database generates or stores, for example, a program that defines the collation processing executed by the AI processing unit, various setting data for executing these processes, learning data used when extracting and collating feature amounts of the face of the person, or the like.

Learning to generate learning data may be performed using one or more statistical classification techniques. The statistical classification techniques include, for example, linear classifiers, support vector machines, quadratic classifiers, kernel density estimation, decision trees, artificial neural networks, Bayesian technologies and/or networks, hidden Markov models, binary classifiers, multi-class classifiers, a clustering technique, a random forest technique, a logistic regression technique, a liner regression technique, a gradient boosting technique, or the like. However, the statistical classification technique used is not limited thereto.

When the server S1 acquires the captured image captured from each of the plurality of cameras C1, . . . and the identification information of the camera that captures the captured image, the processor 31 may detect the person shown in the captured image and generate the face cut-out image, and may also generate the position coordinate information of the detected face for each person.

When the processor 31 determines as a determined result that a person who is not permitted to enter the zone is shown in the face cut-out image, the processor 31 may transmit the face cut-out image and the position coordinate information of the face of the person who is not permitted to enter the zone as a determined result to the terminal device P1. In such a case, the processor 11 in the terminal device P1 generates an alert notification based on the determined result.

The memory 32 as an example of a storage includes, for example, a RAM as a work memory used when executing each processing of the processor 31, and a ROM that stores programs and data defining the operation of the processor 31. The RAM temporarily stores data or information generated or acquired by the processor 31. A program that defines the operation of the processor 31 is written in the ROM. The memory 32 records various setting information and the registrant memory table TB1 transmitted from the terminal device P1.

The registrant database 33 includes a semiconductor memory such as a RAM and a ROM, and a storage device including any of storage devices such as an SSD or an HDD. The registrant database 33 records the face images of the plurality of persons recorded in the registrant memory table TB1.

FIG. 3 is a view showing an example of the registrant memory table TB1. The registrant memory table TB1 is generated and recorded by the server S1.

The registrant memory table TB1 includes face images of face images LT1, LT2, LT3, . . . of a plurality of persons as the registrants, the information on a zone indicating whether or not to permit entry into the zone, and information on an expiration date as a deadline for the entry.

For example, the registrant indicated by the face image LT1 is permitted to enter the zone A and the zone B until an expiration date "2019/12/25 23:59:59". The registrant indicated by the face image LT2 is permitted to enter the zone A until an expiration date "2020/03/30 23:59:59". The registrant indicated by the face image LT3 is permitted to enter the zone B until an expiration date "9999/03/30 23:59:59".

As a result, for example, when there are a plurality of zones (areas) in the same building, the face authentication system 100 according to the first embodiment can manage entrance (entry) into each zone for each person. In addition, the face authentication system 100 according to the first embodiment can easily manage entry of an employee or the like who has a contract period, such as each of the registrants indicated by the face images LT1, LT2, into a building or zone by setting the expiration date by the user operation, for example. Note that the employee whose contract period is indefinite may be set to a value indicating a distance future expiration date, such as the registrant indicated by the face image LT3.

Figure 4:
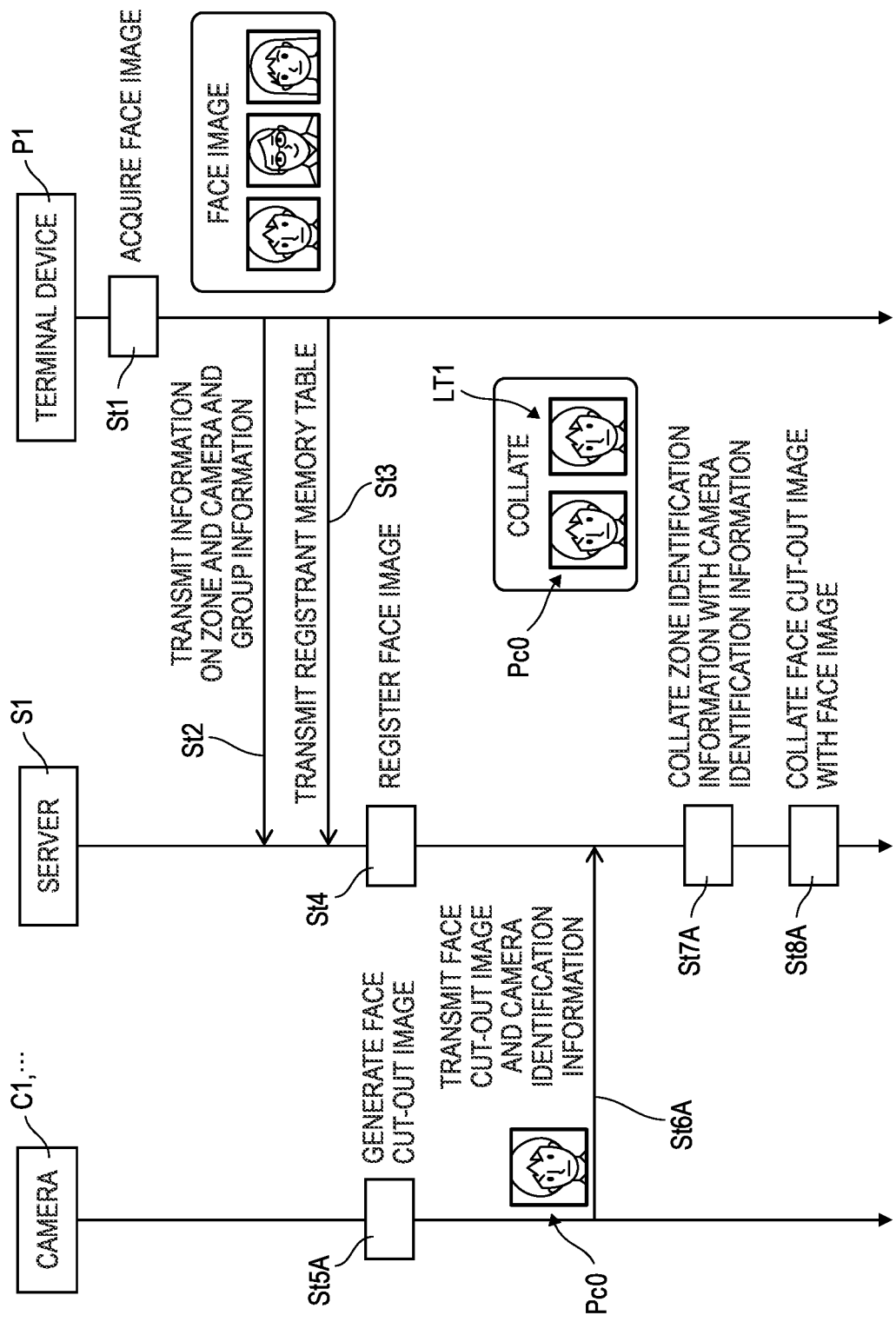
FIG. 4 is a sequence diagram showing an operation procedure example of the face authentication system according to the first embodiment.

FIG. 4 is a sequence diagram showing an operation procedure example of the face authentication system 100 according to the first embodiment. In FIG. 4, an example in which the person shown in the captured image is one person, the person is permitted to enter the zone and no alert notification is generated will be described. In the operation procedure example of the face authentication system 100 shown in FIG. 4, an example in which the terminal device P1 generates and records the information on each zone, the camera identification information and the grouping information of the camera installed in the zone, and the registrant memory table TB1 will be described. These information and tables may be generated and recorded by the server S1 or may be generated and recorded by the terminal device P1.

The terminal device P1 receives settings for each zone and settings for grouping of the cameras installed in each zone by the user operation, and records the setting information. The terminal device P1 acquires and records (registers) each of the face images of the plurality of persons recorded in the registrant memory table TB1 by the user operation (St1). The terminal device P1 may receive input regarding the information on the zone indicating whether to permit entry into the zone and the expiration date by the user operation for each person in the acquired face image, and generate the registrant memory table TB1.

The terminal device P1 transmits the set information on each zone, camera identification information and grouping information of the camera installed in each zone to the server S1 (St2).

The terminal device P1 transmits the registrant memory table TB1 generated based on the user operation to the server S1 (St3).

The server S1 records (registers) the zone identification information of each zone, the camera identification information and grouping information of the camera installed in each zone that are transmitted from the terminal device P1, and the registrant memory table TB1 (St4).

The plurality of cameras C1, . . . capture the images of the plurality of persons entering the zone, and detects the faces of the persons from the captured images, respectively. Each of the plurality of cameras C1, . . . generates the face cut-out image Pc0 obtained by cutting out a region including the detected face of the person (St5A).

Each of the plurality of cameras C1, . . . transmits the generated face cut-out image Pc0, the position coordinate information of the face of the person shown in the face cut-out image Pc0, and the camera identification information to the server S1 (St6A).

The server S1 collates the received camera identification information with the registered camera identification information and grouping information, and determines a zone in which the face cut-out image Pc0 is captured (St7A).

The server S1 collates the face image LT1 recorded in the registrant memory table TB1 with the face cut-out image Pc0 in the zone determined in step St7A, and determines whether the person (person in the face image LT1) shown in the face cut-out image Pc0 is permitted to enter (St8A).

When it is determined that the entry of the person shown in the face cut-out image Pc0 is permitted as a result of the processing in step St8A, the server S1 does not transmit the determined result to the terminal device P1. When it is determined that the entry of the person shown in the face cut-out image is not permitted as a result of the processing in step St8A, the server S1 generates an alert notification and transmits the alert notification to the terminal device P1.

Figure 5:
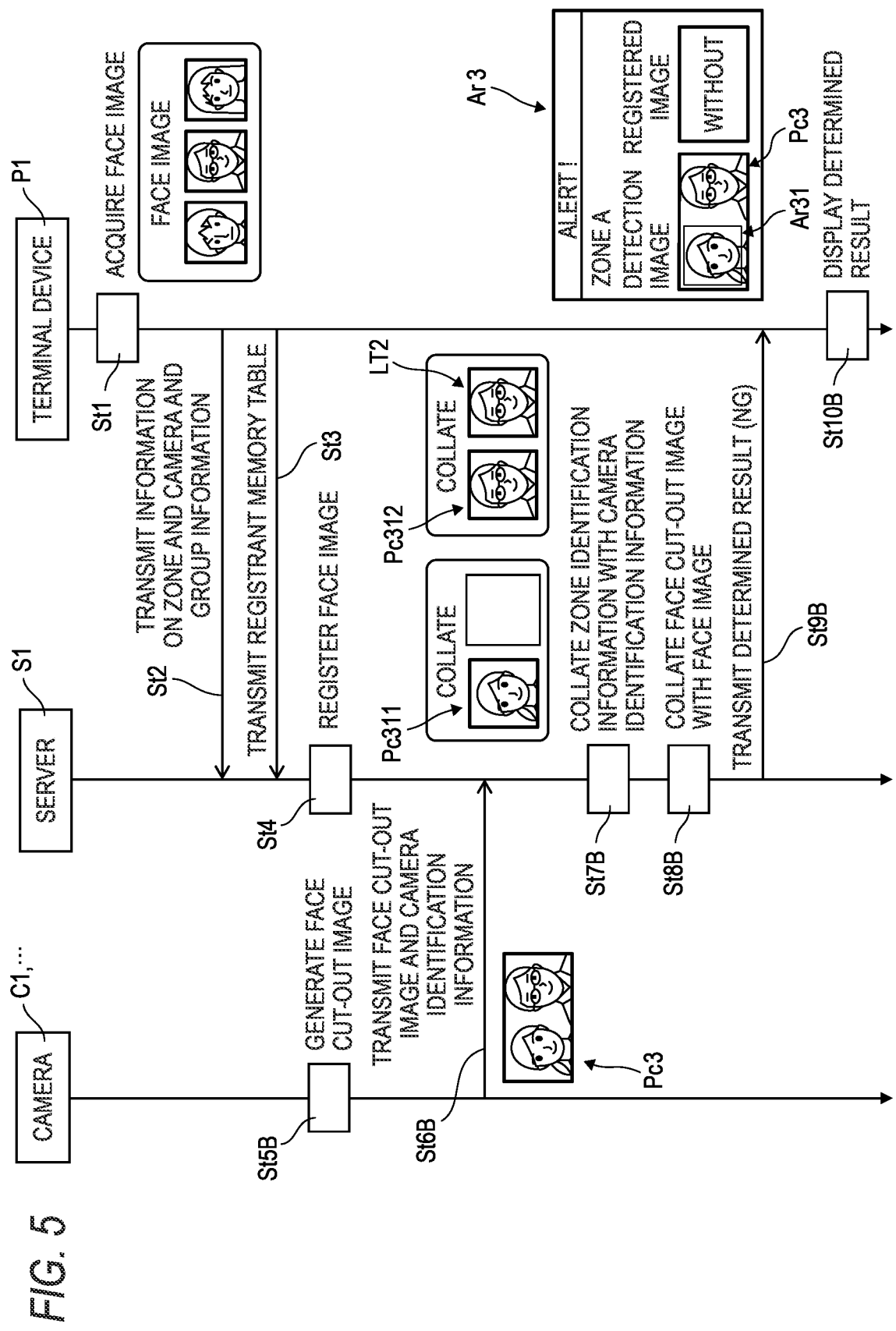
FIG. 5 is a sequence diagram showing an operation procedure example of the face authentication system according to the first embodiment.

FIG. 5 is a sequence diagram showing an operation procedure example of the face authentication system 100 according to the first embodiment. In FIG. 5, an example in which each face of a plurality of persons is shown in one face cut-out image, one of the plurality of persons is not permitted to enter the zone, and an alert notification is generated will be described. The processings in steps St1 to St4 in the operation procedure of the face authentication system 100 shown in FIG. 5 are the same as the processings described in the operation procedure of the face authentication system 100 shown in FIG. 4, and a description thereof will be omitted. In the operation procedure example of the face authentication system 100 shown in FIG. 5, similarly to the example shown in FIG. 4, an example in which the terminal device P1 generates and records the information on each zone, the camera identification information and the grouping information of the camera installed in each zone, and the registrant memory table TB1 will be described.

The plurality of cameras C1, . . . capture the images of the plurality of persons entering the zone, and detects the faces of the plurality of persons from the captured images, respectively. Each of the plurality of cameras C1, . . . generates a face cut-out image Pc3 obtained by cutting out a region including the face of the person detected from the captured image (St5B). In addition, when it is determined that the two persons are shown in the face cut-out image Pc3, each of the plurality of cameras C1, . . . may detect the two persons, and may generate a plurality of face cut-out images Pc311, Pc312 and the position coordinate information of the faces of the two persons.

Each of the plurality of cameras C1, . . . transmits the generated face cut-out image Pc3, the position coordinate information of the face of the person shown in the face cut-out image Pc3, and the camera identification information to the server S1 (St6B). Each of the plurality of cameras C1, . . . may transmit a plurality of face cut-out images Pc311, Pc312, the position coordinate information of the faces of the two persons and the camera identification information to the server S1.

The server S1 collates the received camera identification information with the registered camera identification information and grouping information, and determines a zone in which the face cut-out image Pc3 is captured (St7B).

In the zone determined in step St7B, the server S1 collates the face image recorded in the registrant memory table TB1 with the face image of each of the plurality of persons included in the face cut-out image Pc3, and determines whether the entry of each of the plurality of persons shown in the plurality of face cut-out images Pc3 is permitted (St8B). When the server S1 receives each of the plurality of face cut-out images Pc311, Pc312 from the plurality of cameras C1, . . . , the position coordinate information of the faces of two persons, and the camera identification information, the server S1 may collate the face image recorded in the registrant memory table TB1 with each of the plurality of face cut-out images Pc311, Pc312.

As a result of the processing in step St8B, the server S1 determines that one of the two persons shown in the face cut-out image Pc3 is a person in the registered face image LT2 (person shown in the face cut-out image Pc312) and is permitted to enter the zone. Further, the server S1 determines that the entry of the other person (the person shown in the face cut-out image Pc311) of the two persons shown in the face cut-out image Pc3 is not permitted. Based on the determined result, the server S1 superimposes a detection frame Ar31 for indicating a person who is not permitted to enter the zone and is not located on the face cut-out image Pc3 using the position coordinate information of the face of the other person (the person cut out as the face cut-out image Pc311) in the face cut-out image Pc3 transmitted from each of the plurality of cameras C1, . . . . The server S1 generates an alert notification Ar3 including the face cut-out image Pc3 and transmits the alert notification Ar3 to the terminal device P1 (St9B).

The terminal device P1 displays the alert notification Ar3 transmitted from the server S1 on the monitor 13 (St10B).

Since the face authentication system 100 according to the first embodiment does not display the determined result of each of the plurality of persons who is permitted to enter the zone on the monitor 13, it is possible to reduce a work load of a management work of the user. Therefore, the user can concentrate on only monitoring of persons who are not permitted to enter a zone, which is a purpose of the management task, and can perform the work.

The face authentication system 100 according to the first embodiment can more clearly show a person who is not permitted to enter the zone even when the face cut-out image includes a plurality of persons by superimposing the detection frame surrounding the face of the person who is not permitted to enter the zone. As a result, the face authentication system 100 can detect only a person who is not permitted to enter the zone even when another person who is impersonating a person who is permitted to enter the zone enters the zone or when a person who is not permitted to enter the zone has entered the zone among the plurality of persons who are permitted to enter the zone, for example. Therefore, the user can easily grasp the person who is not permitted to enter the zone from among the plurality of persons.

Figure 6A:
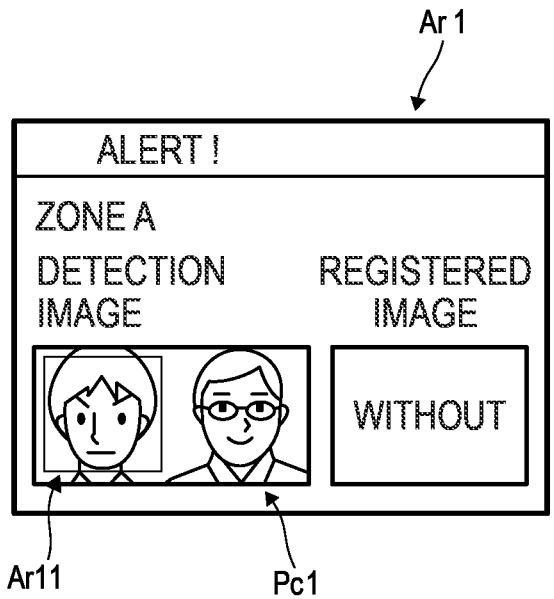
FIG. 6A is a view illustrating an example of alert notification.

FIG. 6A is a view illustrating an example of an alert notification Ar1. The alert notification shown in FIG. 6A is generated by the server S1 when a person who is recorded in the registrant memory table TB1 and whose expiration date has expired enters the zone. The terminal device P1 displays the alert notification Ar1 transmitted from the server S1 on the monitor 13.

The alert notification includes the information on a zone in which an image of a person who is not permitted to enter the zone is captured, and a face cut-out image Pc1 in which an image of a person who is not permitted to enter the zone is captured.

The alert notification Ar1 is generated by the server S1 when it is determined in step St9 in the operation procedure example of the face authentication system 100 shown in FIG. 5 that there is a person whose expiration date has expired among the plurality of persons shown in the face cut-out image Pc1. The alert notification Ar1 is transmitted from the server S1 to the terminal device P1 and displayed on the monitor 13. The alert notification Ar1 includes the face cut-out image Pc1 on which a detection frame Ar11 indicating a person who is not permitted to enter a zone as a detection image is superimposed. In addition, when the expiration date of the person who is not permitted to enter the zone has expired, the alert notification Ar1 does not include a registered image regardless of whether the face image of the person is recorded (registered) in the registrant memory table TB1, as shown in FIG. 6A.

Figure 6B:
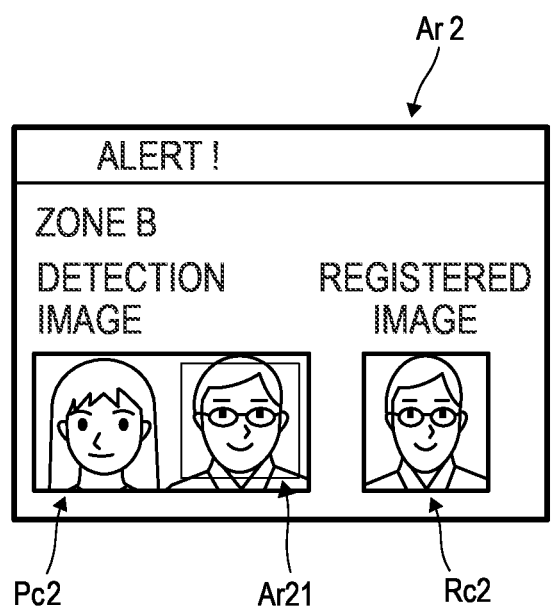
FIG. 6B is a view illustrating an example of the alert notification.

FIG. 6B is a view illustrating an example of an alert notification Ar2. The alert notification shown in FIG. 6B is generated by the server S1 when a person enters a zone other than the zone recorded in the registrant memory table TB1 (that is, the zone where the entry is permitted). The terminal device P1 displays the alert notification Ar2 transmitted from the server S1 on the monitor 13.

The alert notification Ar2 is generated by the server S1 when it is determined in step St9 in the operation procedure example of the face authentication system 100 shown in FIG. 5 that a person recorded in the registrant memory table TB1, among the plurality of persons shown in a face cut-out image Pc2, has entered an unpermitted zone. The alert notification Ar2 is transmitted from the server S1 to the terminal device P1 and displayed on the monitor 13. The alert notification Ar2 includes the face cut-out image Pc2 in which a detection frame Ar21 indicating a person who is not permitted to enter a zone as a detection image is superimposed. The alert notification Ar2 is generated by including, as a registered image Rc2, a face image recorded (registered) in the registrant memory table TB1 when a person is a person recorded (registered) in the registrant memory table TB1 and enters a zone other than a permitted zone as shown in FIG. 6.

Figure 6C:
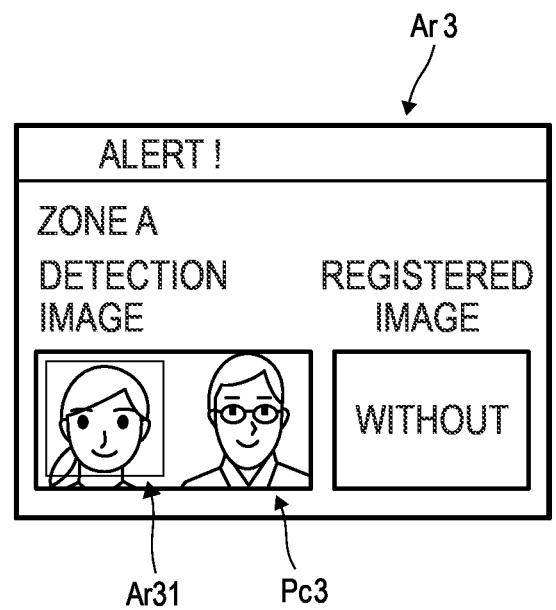
FIG. 6C is a view illustrating an example of the alert notification.

FIG. 6C is a view illustrating an example of the alert notification Ar3. The alert notification shown in FIG. 6C is generated by the server S1 when a person who is not recorded in the registrant memory table TB1 enters the zone. The terminal device P1 displays the alert notification Ar3 transmitted from the server S1 on the monitor 13.

The alert notification Ar3 is generated by the server S1 when it is determined in step St9 in the operation procedure example of the face authentication system 100 shown in FIG. 5 that a person who is not been recorded (registered) in the registrant memory table TB1, among the plurality of persons shown in the face cut-out image Pc3, has entered the zone. The alert notification Ar3 is transmitted from the server S1 to the terminal device P1 and displayed on the monitor 13. The alert notification Ar3 includes the face cut-out image Pc3 in which a detection frame Ar31 indicating a person who is not permitted to enter the zone as a detection image is superimposed. In addition, the alert notification Ar3 does not include a registered image because the face image of the person who is not permitted to enter the zone is not recorded (registered), as shown in FIG. 6C.

As described above, the face authentication system 100 according to the first embodiment includes a storage (memory 12 in the terminal device P1 or memory 32 in the server S1) that stores a face image of each of a plurality of persons who are permitted to enter in advance and information on a zone in association with each other, an image processing unit (processor 21 in the camera or processor 31 in the server S1) that detects faces of one or more persons from an image captured by at least one camera holding identification information, and generates a face cut-out image obtained by cutting out a detected face portion, a zone determination unit (processor 31 in the server S1) that determines a zone in which an image of a person in the face cut-out image is captured based on the identification information of the camera, a collation unit (processor 31 in the server S1) that collates the face cut-out image with each of the face images of the plurality of persons who are permitted to enter the zone in advance, and an output control unit (processor 11 in the terminal device P1 or processor 31 in the server S1) that superimposes and outputs a detection frame indicating a face of a person who is not permitted to enter the zone in the face cut-out image when it is determined that there is not the face of the person shown in the face cut-out image among the face images of the plurality of persons who are permitted to enter the zone in advance.

As a result, the face authentication system 100 according to the first embodiment detects and outputs a person who is not permitted to enter among the plurality of persons in each zone as the monitored area. That is, since the face authentication system 100 can transmit an alert notification only when a person who is not permitted to enter is detected, and can display the alert notification on the monitor 13 in the terminal device P1 used by the user, it is possible to more efficiently support a monitoring work of the user.

The storage (the memory 12 in the terminal device P1 or the memory 32 in the server S1) in the face authentication system 100 according to the first embodiment further stores, in association with a face image of each of the plurality of persons, information on the expiration date for which the entry is permitted. The collation unit (the processor 31 in the server S1) further determines whether the expiration date corresponding to the face image of the person has expired when it is determined that there is a face of a person shown in the face cut-out image among the face images of the plurality of persons who are permitted to enter the zone in advance. The output control unit (the processor 11 in the terminal device P1 or the processor 31 in the server S1) superimposes and outputs the detection frame indicating the face of the person whose expiration date has expired on the face cut-out image, when it is determined that the expiration date has expired as a determined result. As a result, the face authentication system 100 according to the first embodiment can generate the alert notification as a determined result in which a person who is not permitted to enter the zone is emphasized even when the plurality of persons are shown in the captured image and the plurality of persons are shown in the generated face cut-out image. Therefore, even when each of a plurality of persons is shown in the face cut-out image, the user can easily confirm the person who is not permitted to enter the zone.

The storage (the memory 12 in the terminal device P1 or the memory 32 in the server S1) in the face authentication system 100 according to the first embodiment further stores, in association with a face image of each of the plurality of persons, information on the expiration date for which the entry is permitted. In addition, the collation unit (the processor 31 in the server S1) deletes the face image of the person whose expiration date has expired, the information on the zone and the information on the expiration date recorded in association with the face image of the person. As a result, since the server S1 in the face authentication system 100 according to the first embodiment can delete unnecessary data, it is possible to reduce data recording capacity required for recording the registrant memory table TB1.

The storage (the memory 12 in the terminal device P1 or the memory 32 in the server S1) in the face authentication system 100 according to the first embodiment stores the information on the expiration date for which the entry is permitted in association with the face image of each of the plurality of persons, and continuously records the face image of the person whose expiration date has expired, the information on the zone and the information on the expiration date recorded in association with the face image of the person. As a result, the face authentication system 100 according to the first embodiment can save the trouble of registering the face image again when a person who has been permitted to enter the zone in the past is permitted again after the expiration date or the like.

Although various embodiments have been described above with reference to the accompanying drawings, the present disclosure is not limited to such embodiment. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present disclosure. In addition, constituent elements in the various embodiments described above may be arbitrarily combined within a range not departing from the gist of the invention.

Each of the plurality of cameras C1, . . . in the face authentication system 100 according to the first embodiment may store data of a captured video in an external storage device (not shown). The external storage device is connected to the plurality of cameras C1, . . . and the server S1 so as to be able to perform data communication. When the alert notification is included in the determined result transmitted from the server S1, the terminal device P1 may request the data of the captured video including an imaging time before and after the captured image in which the alert notification is generated from the external storage device (not shown) via the server S1. The terminal device P1 can easily confirm the captured video before and after the alert notification is generated by displaying the data of the captured video transmitted from the server S1 on the monitor 13.

INDUSTRIAL APPLICABILITY

The present disclosure is useful as the face authentication system and a face authentication method that detect and output a person who is not permitted to enter among a plurality of persons entering the monitored area and more efficiently support the monitoring work of the user.

The present application is based upon Japanese Patent Application (Patent Application No. 2020-003752 filed on Jan. 14, 2020), the content of which is incorporated herein by reference.

What is claimed is:

1. A face authentication system comprising:
a memory configured to store, in advance, a face image of each of a plurality of persons that is permitted to enter a zone in association with information on the zone;
a processor configured to detect faces of a plurality of people in an image captured by a camera having identification information, and generate face cut-out images obtained by cutting out detected face portions of the plurality of people;
the processor configured to determine a zone where the image is captured based on the identification information of the camera;
the processor configured to collate the face cut-out images with the face image of each of the plurality of persons that is permitted to enter the zone;
the processor configured to display the face cut-out images of the plurality of people; and
the processor configured to, when the processor determines by collation that a face image of a first one of the plurality of people appearing in the face cut-out images is not among the face image of each of the plurality of persons that is permitted to enter the zone, superimpose a detection frame indicating the face image of the first one of the plurality of people that is not permitted to enter the zone on one of the face cut-out images corresponding to the first one of the plurality of people,
wherein, when the processor determines by collation that a face image of a second one of the plurality of people appearing in the face cut-out images is among the face image of each of the plurality of persons that is permitted to enter the zone, the processor does not superimpose the detection frame on one of the face cut-out images corresponding to the second one of the plurality of people.

2. The face authentication system according to claim 1, wherein the memory further stores, in association with the face image of each of the plurality of persons, information on an expiration date for which entry in the zone is permitted;
wherein the processor further determines whether the expiration date corresponding to the face image of the second one of the plurality of people, that is permitted to enter the zone, has expired when the processor determines by the collation that the second one of the plurality of people is permitted to enter the zone; and
wherein the processor superimposes the detection frame indicating the face image of the second one of the plurality of people whose expiration date has expired on a second one of the face cut-out images corresponding to the second one of the plurality of people when the processor determines that the expiration date has expired.

3. The face authentication system according to claim 1, wherein the memory further stores, in association with the face image of each of the plurality of persons, information on an expiration date for which entry in the zone is permitted; and
wherein the processor deletes, from the memory, a face image of a person whose expiration date has expired, and deletes the information on the zone and the information on the expiration date which are stored in association with the face image of the person whose expiration date has expired.

4. The face authentication system according to claim 1, wherein the memory stores information on an expiration date for which entry in the zone is permitted in association with the face image of each of the plurality of persons, and continuously stores a face image of a person whose expiration date has expired, and continuously stores the information on the zone and the information on the expiration date which are stored in association with the face image of the person whose expiration date has expired.

5. A face authentication method comprising:
storing, in advance, a face image of each of a plurality of persons that is permitted to enter a zone in association with information on the zone;
detecting faces of a plurality of people in an image captured by a camera having identification information, and generating face cut-out images obtained by cutting out detected face portions of the plurality of people;
determining a zone where the image is captured based on the identification information of the camera;
collating, by a processor, the face cut-out images with the face image of each of the plurality of persons that is permitted to enter the zone;
displaying, by the processor, the face cut-out images of the plurality of people; and
when the processor determines by collation that a face image of a first one of the plurality of people appearing in the face cut-out images is not among the face image of each of the plurality of persons that is permitted to enter the zone, superimposing a detection frame indicating the face image of the first one of the plurality of people that is not permitted to enter the zone on one of the face cut-out images corresponding to the first one of the plurality of people,
wherein, when the processor determines by collation that a face image of a second one of the plurality of people appearing in the face cut-out images is among the face image of each of the plurality of persons that is permitted to enter the zone, the processor does not superimpose the detection frame on one of the face cut-out images corresponding to the second one of the plurality of people.

6. The face authentication system according to claim 1, wherein the memory stores, in advance, a face image of each of a second plurality of persons that is permitted to enter a second zone in association with information on the second zone,
the processor is configured to collate the one of the face cut-out images of the first one of the plurality of people that is not permitted to enter the zone with the face image of each of the second plurality of persons that is permitted to enter the second zone, and
the processor is configured to, when the processor determines by collation that the first one of the plurality of people that is not permitted to enter the zone is permitted to enter the second zone, output the one of the face cut-out images with the detection frame together with the face image of one of the second plurality of persons which indicates that the first one of the plurality of people is permitted to enter the second zone,
whereby the one of the face cut-out images with the detection frame is different than the face image of the one of the second plurality of persons which indicates that the first one of the plurality of people is permitted to enter the second zone.

7. The face authentication system according to claim 1, wherein the memory stores, in advance, face images a second plurality of persons that is permitted to enter a plurality of zones in association with information on the plurality of zones, the zone being one of the plurality of zones,
the processor is configured to collate the one of the face cut-out images of the first one of the plurality of people that is not permitted to enter the zone with the face images of the second plurality of persons that is permitted to enter the plurality of zones, and
the processor is configured to, when the processor determines by collation that the first one of the plurality of people that is not permitted to enter the zone is not permitted to enter any of the plurality of zones, output the one of the face cut-out images with the detection frame together with indicia which indicates that the first one of the plurality of people is not permitted to enter any of the plurality of zones.

8. The face authentication system according to claim 1, wherein the processor, when the processor determines by collation that there is the face image of the second one of the plurality of people appearing in the face cut-out images among the face image of each of the plurality of persons that is permitted to enter the zone, does not output a determination result.

9. The face authentication system according to claim 1, wherein the processor is configured to display, along with the face cut-out images of the plurality of people, an area for displaying a registered image which is stored in the memory in advance.

10. The face authentication system according to claim 9, wherein the processor is configured to display, in the area for displaying the registered image, indicia which indicates that the first one of the plurality of people is not permitted to enter the zone when the processor determines by the collation that the face image of the first one of the plurality of people appearing in the face cut-out images is not among the face image of each of the plurality of persons that is permitted to enter the zone.

11. The face authentication system according to claim 10, wherein the processor is configured to display, along with the face cut-out images of the plurality of people and the indicia, an alert notification which indicates that one of the plurality of people appearing in the face cut-out images is not permitted to enter the zone.

12. The face authentication system according to claim 11, wherein the alert notification includes information on the zone where the image is captured.

13. The face authentication system according to claim 12, wherein the area for displaying the registered image and the alert notification do not include any face image of the plurality of persons, which is stored in the memory in advance, when the processor determines by the collation that the first one of the plurality of people is not permitted to enter the zone and the processor determines, by the collation, that the face image of the first one of the plurality of people is not among the face image of each of the plurality of persons that is stored in the memory in advance.

14. The face authentication system according to claim 12, wherein the area for displaying the registered image and the alert notification do not include any face image of the plurality of persons, which is stored in the memory in advance, when the processor determines by the collation that the first one of the plurality of people is not permitted to enter the zone, regardless of whether a face image of the first one of the plurality of people is stored in the memory in advance.

15. A face authentication system comprising:
a memory configured to store, in advance, a face image of each of a plurality of persons that is permitted to enter a zone in association with information on the zone;
a processor configured to detect faces of a plurality of people in an image captured by a camera having identification information, and generate face cut-out images obtained by cutting out detected face portions of the plurality of people;

the processor configured to determine a zone where the image is captured based on the identification information of the camera;

the processor configured to collate the face cut-out images with the face image of each of the plurality of persons that is permitted to enter the zone;

the processor configured to display the face cut-out images of the plurality of persons; and the processor configured to, when the processor determines by collation that:

a face image of a second one of the plurality of people appearing in the face cut-out images is not among the face image of each of the plurality of persons that is permitted to enter the zone where the image is capture; and the face image of the second one of the plurality of people is among the face image of each of the plurality of persons that is permitted to enter a different zone than the zone where the image is capture, superimpose a detection frame indicating the face image of the second one of the plurality of people that is not permitted to enter the zone where the image is capture on one of the face cut-out images corresponding to the second one of the plurality of people, wherein, when the processor determines by collation that a face image of a first one of the plurality of people appearing in the face cut-out images is among the face image of each of the plurality of persons that is permitted to enter the zone where the image is captured, the processor does not superimpose the detection frame on one of the face cut-out images corresponding to the first one of the plurality of people.

16. The face authentication system according to claim 15, wherein the processor is configured to display, along with the face cut-out images of the plurality of people, an area for displaying a registered image which is stored in the memory in advance.

17. The face authentication system according to claim 16, wherein the processor is configured to display, in the area for displaying the registered image, the face image of one of the plurality of persons which is stored in the memory in advance and which indicates that the second one of the plurality of people is permitted to enter the different zone than the zone where the image is capture.

18. The face authentication system according to claim 17, wherein the processor is configured to display, along with the face cut-out images of the plurality of people and the face image of the one of the plurality of persons which is stored in the memory in advance and which indicates that the second one of the plurality of people is permitted to enter the different zone, an alert notification which indicates that one of the plurality of people appearing in the face cut-out images is not permitted to enter the zone where the image is captured.

19. The face authentication system according to claim 18, wherein the alert notification includes information on the zone where the image is captured.

20. The face authentication system according to claim 19, wherein the face image of the second one of the plurality of people is different than the face image of the one of the plurality of persons which is stored in the memory in advance and which indicates that the second one of the plurality of people is permitted to enter the different zone.

* * * * *